Nov. 9, 1954 — F. L. DAVIS — 2,694,175
AUTOMOBILE GENERATOR DRIVING MEANS
Filed Feb. 6, 1952 — 2 Sheets-Sheet 2
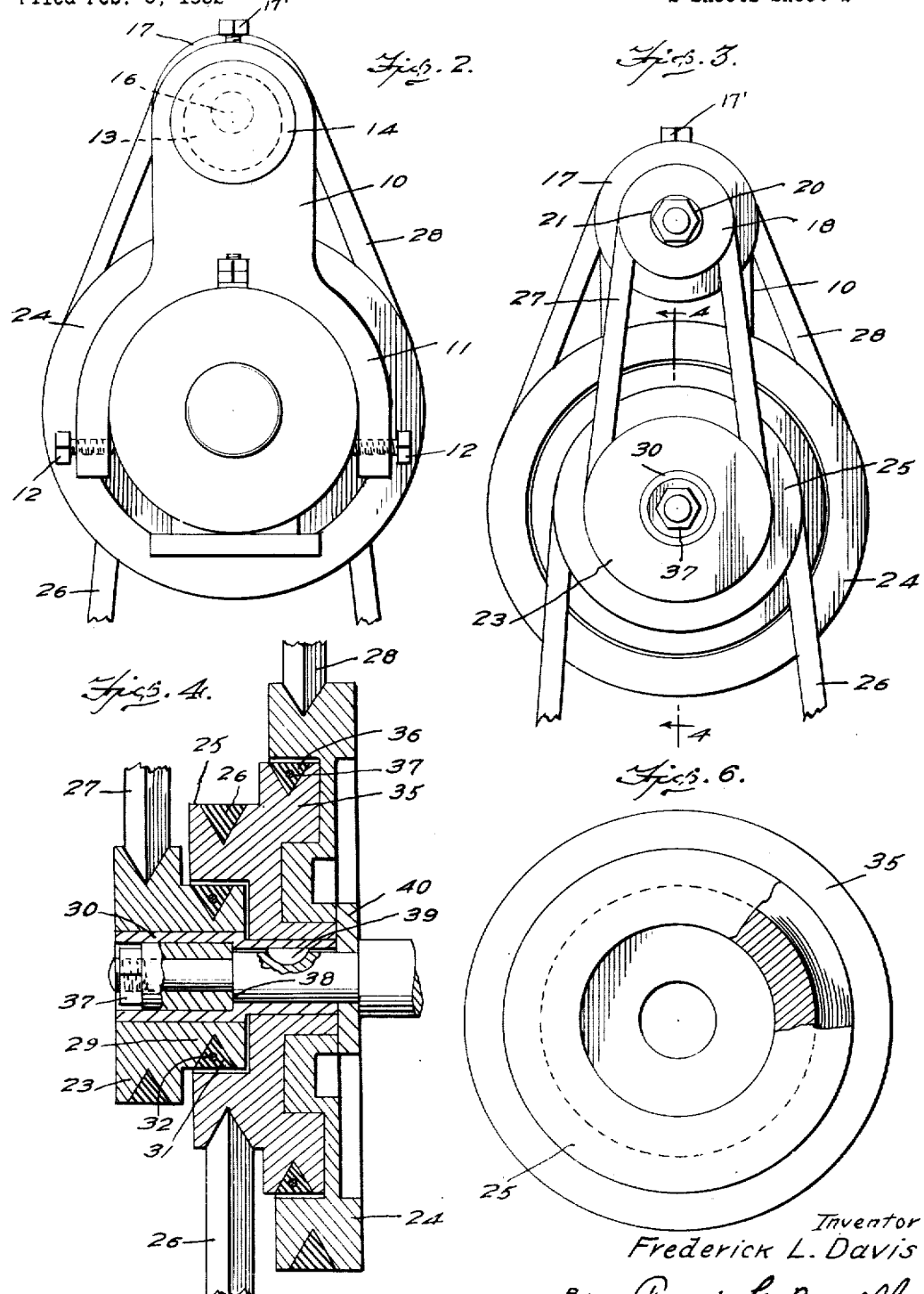
Inventor
Frederick L. Davis
By Francis G. Boswell
ATTY

United States Patent Office 2,694,175
Patented Nov. 9, 1954

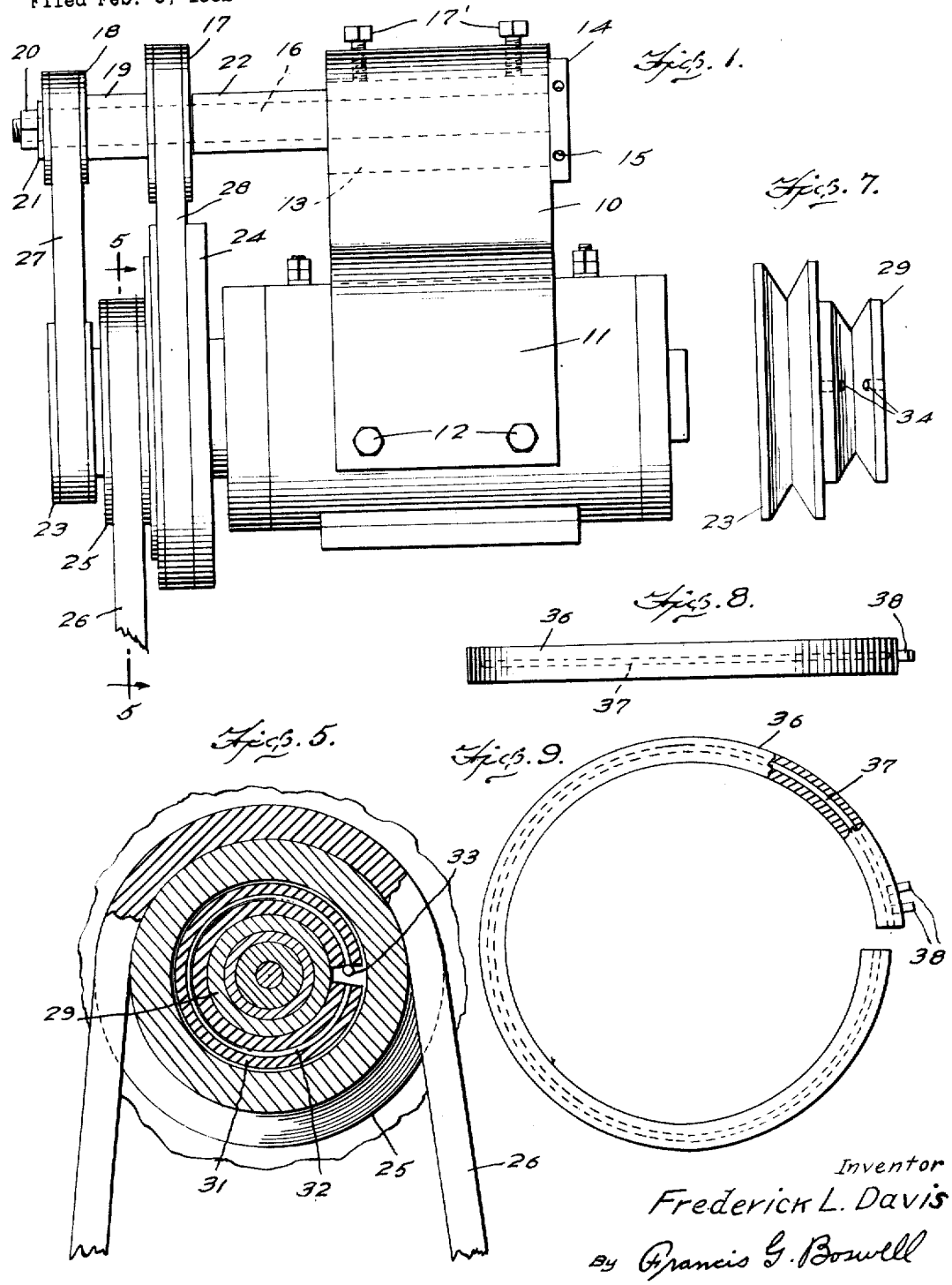

2,694,175

AUTOMOBILE GENERATOR DRIVING MEANS

Frederick L. Davis, Fayetteville, N. C.

Application February 6, 1952, Serial No. 270,237

3 Claims. (Cl. 322—42)

The object of the invention is to provide a mechanism for application to the conventional automobile generator whereby, when the vehicle motor is moving at low or idling speeds, the generator will be accelerated to furnish the current drawn from it at normal speeds, so that under all conditions of operation of the vehicle, the generator will be working at its normal speed to supply all the electrical equipment, thus relieving the battery of the drain that would otherwise be imposed upon it; and to provide a mechanism of this kind which may be applied to any motor vehicle without modification of the equipment of the latter.

With this object in view, the invention consists in a construction and combination of parts of which a preferred embodiment is illustrated in the accompanying drawings, wherein:

Figure 1 is a side elevational view of an automobile generator showing the invention applied in operative position thereon;

Figure 2 is an end elevational view looking from the right side as the invention is viewed in Figure 1;

Figure 3 is an elevational view of the opposite end of the apparatus;

Figure 4 is a sectional view on the plane indicated by the line 4—4 of Figure 3;

Figure 5 is a sectional view on the plane indicated by the line 5—5 of Figure 1;

Figure 6 is a side elevational view, partly in section, of the driving member;

Figure 7 is an edge elevational view of the smaller of the driven members;

Figure 8 is an edge elevational view of the larger of the friction rings; and

Figure 9 is a side elevational view of the structure of Figure 8.

The primary object of the invention being to relieve the automobile battery of the drain on it that normally occurs when the vehicle engine or motor is turning at idling or low speeds, the structure to accomplish this object comprises a differential clutch interposed between the vehicle motor and the generator and a counter-shaft through which the generator is accelerated when the vehicle motor drops to idling speed.

The counter-shaft is mounted on the bracket 10 which upstands from a saddle 11 with which it is integrally formed, the saddle being of generally U-shaped form to straddle the frame or body of the generator with the extremities below the horizontal diameter of the generator and receiving the cap screws 12 which pass through it on opposite sides of the generator and bear on the periphery of the latter. The saddle is thus rigidly mounted on the generator and in such position supports the bracket so that the latter stands upright. The bracket is bored on a line parallel with the axis of the generator armature and in this bore receives the hub 13 which is formed with a head 14 having peripheral radial seats 15 in which a pin wrench may be inserted to turn the hub, so as to adjust the spacing of the counter-shaft 16 which has a force fit in the hub but eccentrically of the latter.

Set screws 17' mounted in the bracket function to retain the hub in any of its adjusted positions.

The counter-shaft 16 carries the idler pulleys 17 and 18 which are formed as integral parts of the hub 19, this assembly being retained on the counter-shaft by the nut 20 engaged with the threaded extremity of the shaft and bearing on the washer 21 which bears on a shoulder on the shaft where the threaded portion exists. A sleeve 22 mounted on the shaft between the pulley 17 and the hub 13 serves as a spacer for the dual pulley to properly position the two elements with respect to the driven pulleys 23 and 24 of the differential clutch, of which the driver 25 and the driven pulleys 23 and 24 constitute elements, the driver being formed peripherally with a V-groove traversed by a belt 26 designed for connection to a drive pulley on the vehicle motor. The driven pulley 23 is operatively connected with the pulley 18 through a belt 27, while the driven pulley 24 is operatively connected with the pulley 17 by means of a belt 28.

The driven pulley 23 is fixed with respect to the clutch disc 29 and both are mounted on the sleeve 30, the latter being secured to the two by means of a force fit. The driver 25 is pocketed to receive the disc 29 and is formed with a peripheral cross-sectionally V-shaped groove in which a similarly shaped friction ring 31 is received, the friction ring having a core 32 of spring wire connected with a cross pin 33 which seats in a groove 34 formed in the disc. The friction ring 31 is split and the core has a spring tendency to expand the ring, so that the outer periphery of the latter contacts with the cylindrical surface of the pocket formed in the driver 25.

The driver has a similar clutch connection with the driven pulley 24, the latter being formed with annular pocket in which is received a ring element 35 formed as an integral part of the driver 25. This ring element is peripherally grooved, with the groove made cross-sectionally V-shaped, and receives in such groove the friction ring 36 which is also formed with a core 37 similar to the core 31 but, as indicated in Figure 9, the core is tensioned so as to circumferentially contract the friction ring, at one end of which are mounted the pins 38 which radially enter the ring and are secured to the core, these pins entering sockets in the cylindrical wall of the pocket in the driven pulley 24.

The friction ring 36 is anchored at one end to the driven pulley 24 by means of the pins 38, as is the friction ring 31 anchored to the disc 29 by means of the cross pin 33 and the former, by means of the contractile form of its core tends to hug the ring 35, while the latter, by reason of the expansion of its core, tends to bear against the cylindrical surface of the pocket in the driver 25. By reason of this construction, if the angular speed of the driver is less than the angular speed of the driven pulley 23, the friction ring will tend to slide over the cylindrical surface of the driver, since such increased speed will tend to drag the friction ring along the cylindrical surface of the driver. But if the angular speed of the driver exceeds the angular speed of the driven pulley 23, there will be a clutching action due to the frictional engagement of the ring with the driver and the tendency of such ring to unwind, it being so mounted that when the driver is the moving force, an unwinding tendency will be imparted to the friction ring.

The clutching action between the driver and the driven pulley 24 results from the driver tending to wind its friction ring around the clutch ring 35 and when the driven pulley 24 drops below a certain critical angular speed, the friction ring will tend to wind around the ring 35 and be driven along with the driven pulley 24 by the driver. However, when the driver attains a specified angular speed, the centrifugal force then active on the friction ring 36 will tend to throw the latter out against the cylindrical surface of the pocket in the driven pulley 24 and the driver can rotate free of it.

Assume the proper direction of rotation of the generator to be right-handedly as viewed in Figure 3 and assume that the driver 25 is moving at a relatively slow angular speed due to the vehicle engine running below normal speed or at idling speed. Under such condition, the driver will pick up the driven pulley 24 by reason of the clutching action of the friction ring 36, and the driven pulley will be thus moved by the driver, as will also the driven pulley 23 but motion to the latter is communicated from the driven pulley 24 through the counter-shaft pulleys 17 and 18 and their attendant belts. Thus the generator will be driven at a greater speed than would be the case with the generator armature being moved direct from the vehicle motor. Now let the vehicle motor be accelerated. This will result in increased angular speed of the driver 25 with a corresponding increase in the angular speed of the driven pulley 24, when the centrifugal force thus imparted to the friction ring 36 will disengage it from the driver, but the latter can pick up the driven pulley 23 direct through the clutching action of its friction ring 31. When the driven pulley 23 is actuated through the countershaft, its angular speed was exceeding that of the driver 25 and there was no clutching action, the friction ring operating as an over-running clutch. However, when the driver attained the additional speed to de-clutch the driven pulley 24, it picked up the driven pulley 23 which, being directly connected with the armature shaft rotated the generator at the approximate speed at which it was rotated with the driver running at lesser speed. When the driver is clutched with the driven pulley 23, the latter reacts through the counter-shaft pulleys and their attendant belts, to keep the driven pulley 24 moving at a speed where centrifugal force will keep that de-clutched from the driver.

The sleeve 30 is secured to the generator shaft by means of a sleeve nut 37 engaging a threaded extremity of the shaft, the sleeve nut bearing on a shoulder 38 formed adjacent the threaded portion and being prevented from angular or turning movement by means of a key 39 of the Woodruff type. As before stated, the driven pulley 23 and its attendant disc are fixed on the sleeve and therefore are fixed with respect to the armature shaft, but the driver 25 and driven pulley 24 are journalled on the sleeve between a shoulder thereon and the washer 40 which bears against the shoulder on the generator shaft.

Removing the sleeve nut, the differential clutch can be removed in its entirety and the several parts separated for repair or replacement of any parts that may wear, as for example, the friction rings effecting the clutching action in the two. The differential clutch thus serves to keep the generator at or above a minimum speed which will be sufficient to generate the necessary voltage to furnish all the amperage required for all the electrical apparatus of the vehicle, including charging of the storage battery, the driven pulley 24 functioning when the vehicle motor speed is low or idling and the driven pulley 23 functioning when the vehicle motor speed is normal or high. Thus the only function that will be left for the car battery will be the starting operation with the result that battery trouble will be reduced to a minimum.

The invention having been described, what is claimed as new and useful is:

1. In a mechanism of the kind indicated, the combination with an automobile generator, of a counter-shaft, a saddle releasably engageable with the generator, and having a bracket supporting the counter-shaft pulleys mounted on the counter-shaft, and a differential clutch embodying a driver for operative connection with the automobile engine and driven pulleys having belted connection with the counter-shaft pulleys and clutch members for alternately engaging them with the driver depending on whether the angular speed of the latter is high or low.

2. In a mechanism of the kind indicated, the combination with an automobile generator, of a counter-shaft, a saddle releasably engageable with the generator, and having a bracket supporting the counter-shaft, pulleys mounted on the counter-shaft, and a differential clutch embodying a driver for operative connection with the automobile engine and driven pulleys having belted connection with the counter-shaft pulleys and clutch members for alternately engaging them with the driving pulley depending on whether the angular speed of the latter is high or low, the counter-shaft having an eccentric mounting in the bracket so that the shaft may be angularly adjusted to tension the belts connecting the counter-shaft pulleys with the driven pulleys.

3. In a mechanism of the kind indicated, the combination with an automobile generator, of a counter-shaft, pulleys mounted on the counter-shaft, a first pulley mounted on the generator shaft for belted connection with the automobile engine, a second pulley on one side of the first pulley and having a fixed connection with the generator shaft, a third pulley on the opposite side of the said first pulley and also mounted on the generator shaft, belts connecting the said second and third pulleys with the countershaft pulleys, the latter and the third pulley constituting a train of pulleys, a clutch interposed between the said second pulley and first pulley and engageable to effect a driving connection between the two only when the engine speed is high enough to attain the normal speed of the generator, and a clutch included in said pulley train to effect a driving connection between said third pulley and second pulley through the countershaft only when the speed of the engine is too low to attain the normal speed of the generator.

References Cited in the file of this patent

UNITED STATES PATENTS

| Number | Name | Date |
|---|---|---|
| 1,111,864 | Sanladerer | Sept. 29, 1914 |
| 1,190,496 | Whitney | July 11, 1916 |
| 1,378,490 | Sperry | May 17, 1921 |
| 2,187,181 | Shackelford | Jan. 16, 1940 |

FOREIGN PATENTS

| Number | Country | Date |
|---|---|---|
| 335,079 | France | of 1904 |